United States Patent [19]

Heng et al.

[11] Patent Number: 4,712,863

[45] Date of Patent: Dec. 15, 1987

[54] JUNCTION BLOCK FOR OPTICAL FIBERS

[75] Inventors: Jean-Paul Heng, Lyons; Marcel Jusseau, Villeurbanne; Alain Humbert-Labeaumaz, Bron, all of France

[73] Assignee: Cgee Alsthom, Levallois-Perret, France

[21] Appl. No.: 873,551

[22] Filed: Jun. 12, 1986

[30] Foreign Application Priority Data

Jun. 12, 1985 [FR] France .................................. 85 08902

[51] Int. Cl.⁴ .............................................. G02B 6/38
[52] U.S. Cl. .............................. 350/96.21; 350/96.20
[58] Field of Search ................ 350/96.20, 96.21, 96.22

[56] References Cited

U.S. PATENT DOCUMENTS 3,912,574 10/1975 Cherin et al. ................ 350/96.21 X
4,146,301 3/1979 Cherin et al. ..................... 350/96.21
4,327,964 5/1982 Haesly et al. ................ 350/96.21 X
4,445,750 5/1984 Grois et al. ....................... 350/96.21

FOREIGN PATENT DOCUMENTS 2538919 7/1984 France ............................. 350/96.15

56-6210 1/1981 Japan ................................ 350/96.20

Primary Examiner—John Lee
Assistant Examiner—Michael Menz
Attorney, Agent, or Firm—Sughrue, Mion, Zinn, Macpeak & Seas

[57] ABSTRACT

A junction block for end-to-end interconnection of two optical fibers, said block comprising two identical parts (1) assembled face-to-face and forming a block having a fiber-receiving duct (13) passing therethrough, said duct being built up from two half ducts each running along a corresponding one of said parts, said duct being suitable for receiving two fibers inserted into respective ends thereof, and for positioning the cores of said two fibers in end-to-end alignment inside a mid guide portion thereof (13E), and for holding said fibers in place by clamping their respective coatings inside two retaining members (13B1, 13B2) of the duct which are located adjacent to respective ends thereof and each of which is constituted by two half-members which are resiliently separable to enable a fiber to be connected to pass therethrough in order to properly position the core of said fiber for interconnection with the core of the other fiber.

8 Claims, 4 Drawing Figures

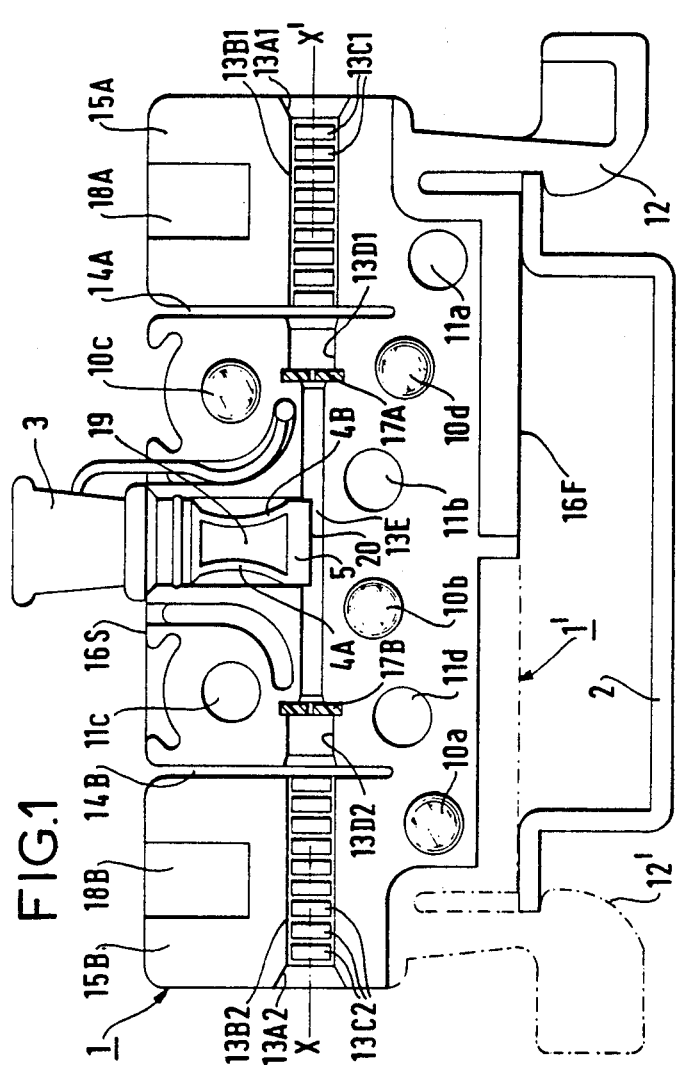
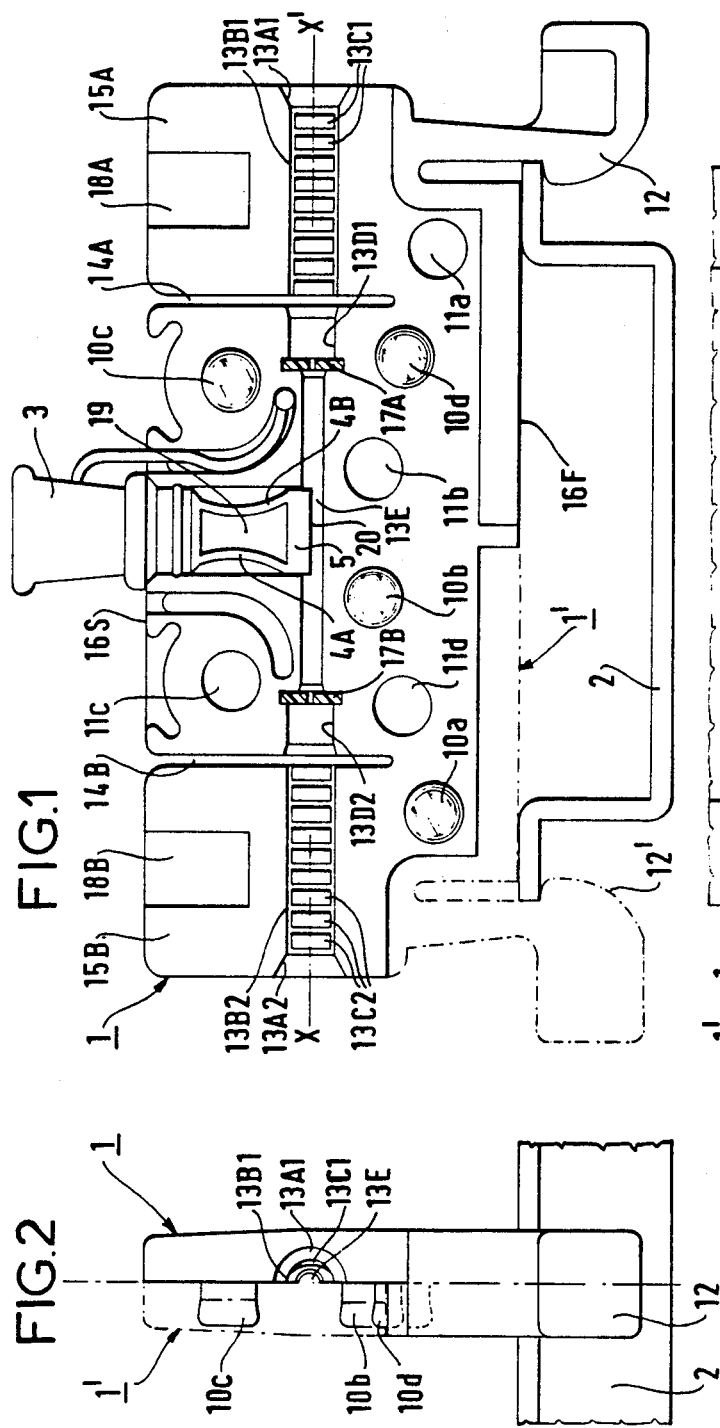
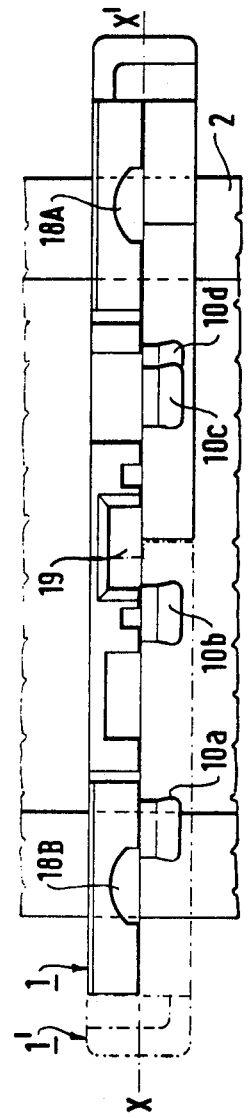
FIG.1
FIG.2
FIG.3

JUNCTION BLOCK FOR OPTICAL FIBERS

The present invention relates to a junction block for interconnecting optical fibers end-to-end.

BACKGROUND OF THE INVENTION

It is only recently that optical fibers have become common components in installations which previously included connections made by electrical wires only. Installers thus often need to fit units for interconnecting optical fibers side-by-side with units for interconnecting electrical wires, and this has led to a demand for connection equipment, and in particular optical junction blocks, suitable for being easily associated with electrical junction blocks, and in particular for being mounted on the same supports.

It has been common practice for a long time to provide electrical junction blocks with certain common characteristics to enable them to be mounted on various different standardized supports and to facilitate their use in connecting wires. For example, CGEE Alsthom's published French patent specification No. 2 502 445 describes a junction block comprising two cups which are closed against each other to form a closed block which is mountable on a rail and which includes at least one printed circuit card inside together with connection terminals which are accessible from the outside. Other similar blocks merely have connection terminals interconnected in pairs and are each made from two cups which are held together by snap fastening studs on one of the cups being received in corresponding recesses in the other.

Preferred implementations of the present invention thus provide a junction block for optical fibers analogous to the above-mentioned electrical junction blocks and suitable for easy and accurate interconnection of optical fibers.

SUMMARY OF THE INVENTION

The present invention provides a junction block for end-to-end interconnection of two optical fibers, said block comprising two identical parts assembled face-to-face and forming a block having a fiber-receiving duct passing therethrough, said duct being built up from two half ducts each running along a corresponding one of said parts, said duct being suitable for receiving two fibers inserted into respective ends thereof, and for positioning the cores of said two fibers in end-to-end alignment inside a mid guide portion thereof, and for holding said fibers in place by clamping their respective coatings inside two retaining members of the duct which are located adjacent to respective ends thereof and each of which is constituted by two half-members which are resiliently separable to enable a fiber to be connected to pass therethrough in order to properly position the core of said fiber for interconnection with the core of the other fiber.

BRIEF DESCRIPTION OF THE DRAWINGS

An embodiment of the invention is described by way of example with reference to the accompanying drawings, in which:

FIG. 1 is a side view of a component part of a junction block in accordance with the invention, with said part being shown in association with an identical part fixed thereto to constitute a block, said identical part being outlined in the figure by means of a dot-dashed line;

FIG. 2 is an end view of a junction block built up from the parts shown in FIG. 1, with solid lines representing the part shown in detail and dot-dashed lines representing the other part;

FIG. 3 is a top view of the block shown in FIGS. 1 and 2 shown without its stopper.

MORE DETAILED DESCRIPTION

Figure 4:
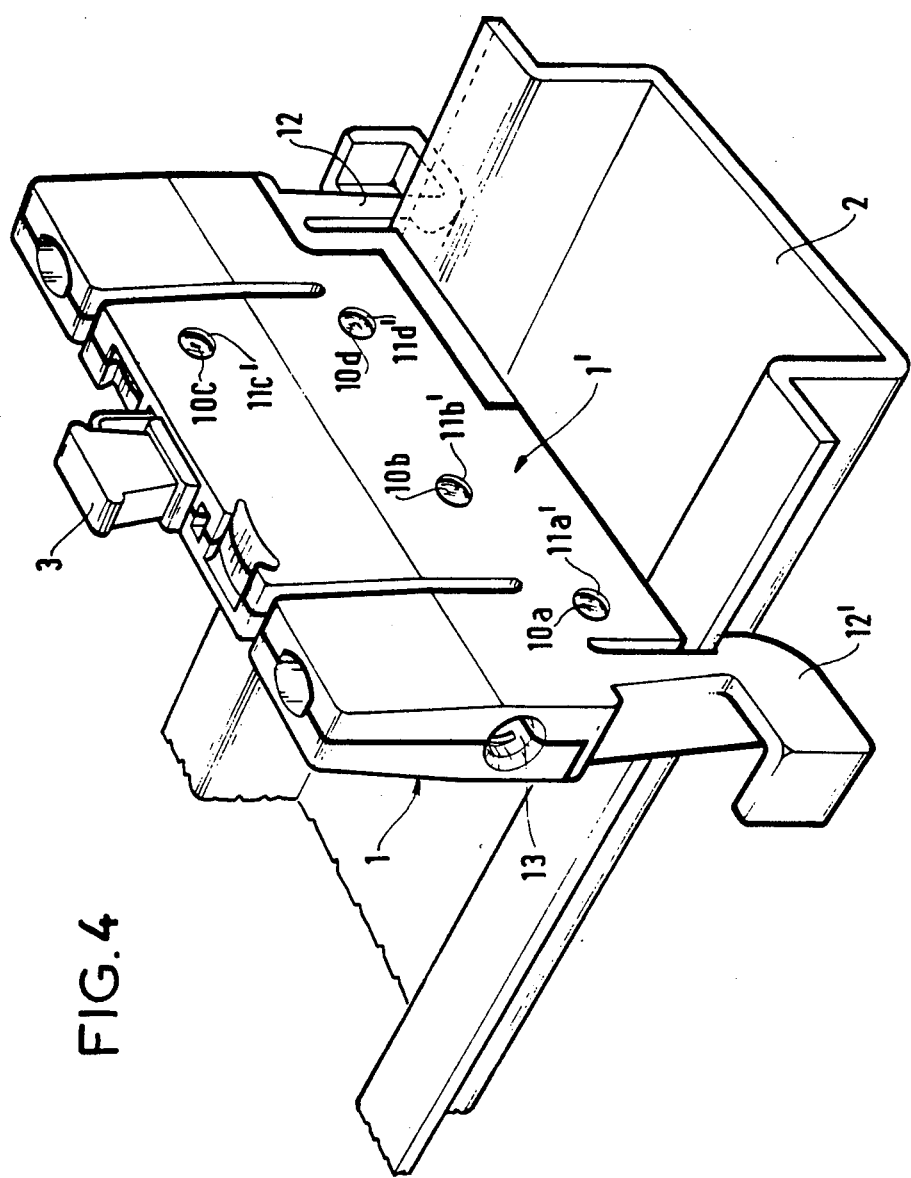
FIG. 4 is a perspective view of a junction block obtained by fitting together two component parts, with said junction block being mounted on a support rail.

The junction block shown in FIGS. 1 to 4 comprises two identical parts referenced 1 and 1', with the part 1 being shown in solid lines and the part 1' being shown in dot-dashed lines in FIGS. 1 to 3. A closed block is obtained by applying identical open faces of said component parts against one another. In the embodiment shown the parts are identical and therefore hermaphrodite, with each part having studs 10 or 10' which cooperate with complementary recesses 11 or 11' to snap fasten the parts together. In the example shown, four studs 10a, 10b, 10c and 10d on the part 1 are received in four corresponding recesses 11a', 11b', 11c', and 11d' of part 1', and similarly the four studs on said part 1' are received in the recesses 11a, 11b, 11c, and 11d of the part 1, thereby accurately positioning the parts 1 and 1' relative to each other.

The studs 10 and the recesses 11 alternate and are distributed in such a manner as to provide as great a cohesion as possible between the two parts held together thereby. In the embodiment shown, the studs and recesses alternate along the base of the block and also along the top of the block, but only near its middle, for reasons which are explained below.

The junction block constituted by fitting together two identical parts is in the conventional shape of a rectangular box having two large parallel side faces suitable for coming into side-by-side contact with other similar or identical blocks, and with the thickness of the box, and thus of the block, being conventionally much less than the other outside dimensions.

The junction block is fixed to a support rail 2 by fixing lugs which project therefrom. The lugs may be added to the junction box as described in CGEE Alsthom's published French patent specification No. 2 184 215, or else they may be integrally molded with said parts 1 and 1' as shown in FIGS. 1 to 4.

In the embodiment shown, each part has a single lug 12 of conventional type, i.e. the part 1 has a lug 12 and the part 1' has a lug 12', and in both cases the lug has a latching surface suitable for engaging behind a lip of the rail 2, which lip is clamped between the latching surface and a facing portion of the bottom wall 16F of the part from which the lug projects.

A duct 13 passes lengthwise through the junction block constituted by two identical parts in face-to-face contact, and serves to receive two optical fibers (one being inserted from each end of said duct 13) for the purpose of bringing the fibers into end-to-end contact with each other.

The duct 13 is split longitudinally, e.g. along a diametrical plane, and is built up from two half ducts each belonging to a different one of the parts 1 and 1' of the block, and each of which has its concave portion disposed to co-operate with the concave portion of the other half duct.

In the embodiment shown, the half duct of the part 1 is rectilinear, it extends parallel to the bottom wall 16F of the block and to the support rail 2, and it extends perpendicularly to the longitudinal axis of the support rail which is seen end on in FIG. 1.

The optical fibers to be connected are not shown in the figures, given that they are conventionally constituted by a cylindrical core covered by a a cylindrical coating and that said cores coatings are generally of the same diameter for the two optical fibers to be interconnected.

The duct 13 comprises a plurality of successive cylindrical portions about a common longitudinal axis XX', with each of said portions being split longitudinally about the above-mentioned diametrical plane which includes said axis XX' and which is parallel to the large side faces of the assembled block.

The two end portions of the duct 13 are conical and each conical end portion is built up from two half cones, one from each of the parts 1 and 1'. Conversely, each of the parts has two half cones, one at each end of the duct, e.g. half cones 13A1 and 13A2 in the part 1. The end conical portions are outwardly flared to facilitate inserting an optical fiber and its coating into the duct.

On each part the half cones such as 13A1 and 13A2 are followed by respective half retaining members such as 13B1 for the half cone 13A1 and 13B2 for the half cone 13A2. The half retaining members build up to contitute generally cylindrical duct portions aligned on the axis XX' and of slightly larger diameter than the coating of the optical fiber to be inserted therein. However, each of the four half retaining members such as 13B1 or 13B2 is provided with a succession of inwardly projecting teeth such as 13C1 or 13C2. These teeth are crescent shaped as can be seen in FIG. 2 and they bear against the coating of an optical fiber passing between the teeth, thereby retaining the fiber.

The inner ends of the retaining members are delimited by transverse slots 14A and 14B with the slot 14A being at the inner end of the half retaining member 13B1 and the slot 14B at the inner end of the half retaining member 13B2. The slots 14A and 14B separate respective end portions 15A and 15B in which th entry cones and the retaining members are formed from the central portion of the parts 1 and 1'. Each of the transverse slots passes through the entire thickness of the part in which it is formed and it extends over a portion of the height thereof, to open out, preferably, in the opposite face to the face from which the lugs 12 project, i.e. they open out into the top face 16S of the resulting block.

Beyond said slots, the middle portion of the duct 13 is constituted by two cylindrical housings each built up from a pair of half housings such as 13D1 and 13D2. Each of the housings is short in length and preferably has a flared inlet opening out towards the associated slot so as to facilitate insertion of an optical fiber therein after passing through the preceding retaining member.

Sealing rings 17A and 17B are disposed in respective circumferential grooves at the inner end of each housing 13D1 and 13D2, respectively, at the point where the end of the optical fiber coating will come into abutment. The two housings 13B1 and 13B2 are interconnected by a mid cylindrical guide which is built up from two half cylinders, such as the half cylinder 13E for the part 1. The diameter of the guide is slightly greater than the diameter of the optical fiber cores which are to be inserted therein from each of its ends in order to allow them to come into end-to-end contact in the middle of the guide.

As mentioned above, the various portions of the two interconnected parts 1 and 1' are normally applied against one another and it is not normally possible to separate them without using a tool.

In particular, the end portions 15A and 15B of the part 1 are normally applied against corresponding end portions of an identical part 1' in such a manner as to prevent insertion into an assembled block of optical fibers of the kind intended to be interconnected thereby, since the teeth in the retaining members prevent such insertion.

In order to insert an optical fiber, the meeting end portions 15A and 15B' (or 15A' and 15B) must be moved slightly apart from each other so as to enlarge the duct formed by the two half cylinders constituting a retaining member, and in particular so as to move the inwardly projecting teeth far enough apart from each other to allow a fiber and its coating to be inserted between the teeth.

To this end, a recess 18 is provided on the inside edge of at least one of the meeting end portions to enable a tool to be inserted for temporarily pushing the meeting end portions slightly apart while the remainder of the assembled block remains firmly pressed together.

In the embodiment shown, the recesses 18 are in the form of blind holes 18A or 18B whose cross section is at least generally elongate parallel to the axis XX' (e.g. is semi-oval) and is made in the inside, top edge of each of the end portions 15A and 15B to extend parallel to the large side face of the part in which it is made. These recesses open out into the top wall 16S and combine with corresponding recesses in the other part 1' so as to constitute a tool-receiving passage of elongate section parallel to the inside top edges of the assembled parts.

It is then possible to insert a generally rectangular section blade of a tool such as a screwdriver (not shown) into the recess with the large faces of the blade extending parallel to the inside top edges of the assembled parts. The screwdriver can then be rotated axially inside the recess so as to push apart the previously meeting end portions temporarily and far enough to enable an optical fiber to be inserted into the block.

The elasticity of the plastic material from which the parts are made, and in particular of the plastic material constituting the studs 10 and the stud-receiving recesses 11 ensure that the end portions return to the meeting position once the tool has been removed.

Finally, each part has a rectangular section half ducts 19 extending from the middle of the top face thereof down to a window 20 provided in the mid portion of the fiber-receiving duct. The meeting half ducts 19 form an access chimney to the guide portion of the fiber-receiving duct.

The access chimney is used to visually inspect the ends of the fibers to see whether they have made end-to-end contact, and it may also be used to insert a refractive index matching gell over the meeting fiber ends.

A stopper 3 which is shown as being generally rectangular like the inspection chimney is provided for closing the chimney once the connection has been made, and it is mounted captive to avoid loss in the example shown.

The stopper has two resilient legs 4A and 4B which are connected to a base 5 which is suitably shaped to hold the two optical fibers at their connection transversely and in exact alignment, for example the base 5 may have a longitudinal centering groove (not shown).

The method of interconnecting two optical fibers after their ends have been suitably stripped over a length corresponding to one half of the central guide, may be performed either fully on site, or else partially in a factory and partially on site. In each case, a junction block built up from two parts 1 and 1' is partially opened by means of a screwdriver inserted between the meeting pairs of end portions 15A, 15B in order to allow optical fibers to be inserted into each end of the duct 13 via the inlet cones and the retaining members thereof. Each fiber is inserted longitudinally until the end of its core is located under the chimney after passing along a corresponding half of the guide, and with the coating coming to rest in the cylindrical portion at the corresponding end of the guide. On screwdriver removal, each optical fiber is locked in position by its coating being clamped between the teeth of the corresponding retaining members.

We claim:

1. A junction block for end-to-end interconnection of two optical fibers each having a core and a coating about said core, said block comprising two identical parts having identical faces assembled flush face-to-face, and forming a block having a fiber-receiving duct passing therethrough, said parts each including a half duct running along a corresponding one of said parts within said face thereof, said duct having a mid guide portion and two retaining members suitable for receiving two fibers inserted into respective ends thereof, and for positioning the cores of said two fibers in end-to-end alignment inside said mid guide portion thereof, and for holding said fibers in place by clamping their respective coatings inside two retaining members of the duct, said two retaining members being located adjacent to respective ends of said mid guide portion and each retaining member being constituted by two resiliently separable, half retaining members allowing momentary lateral separation after face-to-face assembly of said block parts at the plane of the face-to-face assembly of said parts to enable a fiber to be connected to pass therethrough in order to properly position the core of said fiber for interconnection with the core of the other fiber.

2. A junction block according to claim 1, wherein the half retaining members of each part are situated in end portions of the part, and said end portions being partially separated from said central portion thereof by respective slots, thereby enabling localized limited and temporary lateral separation of the end portions only of the two parts of the assembled block while the mid portions of said two parts remain in direct contact with each other.

3. A junction block according to claim 2, wherein each part includes a recess for receiving the blade of a tool, said recesses being provided along the inside edge of at least one of said end portions so as to enable said limited separation of said end portions to be effected by the action of said tool inserted between said recesses, thereby sufficiently enlarging a retaining member constituted by respective face to face end portions of said block to enable an optical fiber to be inserted therebetween.

4. A junction block according to claim 3, wherein each part is of hermaphrodite form generally rectangular in shape and includes an alternating sequence of studs and stud-receiving recesses which are complementary to the studs, said alternating sequence extending along the base of each part between the rectilinear half duct which runs transversely thereacross, and above the center portion thereof, and said part further including two transverse slots separating the center portion containing the mid half guide from the end portions each of which contains a half retaining member with a half recess thereabove for receiving the blade of a tool, and wherein said transverse slots and said half recesses opening out into the top wall of the block.

5. A junction block according to claim 4, wherein the duct is built up from pairs of semi-cylindrical elements which are open towards each other, with each semi-cylindrical element of each pair constituting a portion of a different one of the parts.

6. A junction block according to claim 5, wherein the retaining half members of each part are provided with a succession of inwardly projecting crescent-shaped teeth for clamping against the coating of an optical fiber in order to grip the fiber.

7. A junction block according to claim 2, further including a chimney in the form of two equal chimney halves extending through the mid portions of the assembled parts, said chimney opening out at one end, into the middle of the mid guide portion of the fiber-receiving duct and at the other end to the outside of the block to enable the end-to-end contact of the fiber cores to be visually inspected and to enable a refractive index matching gell to be deposited on the ends of the interconnected fiber cores.

8. A junction block according to claim 7, further comprising a chimney stopper closing the chimney and holding in place and centering the two optical fibers where they meet.

* * * * *